United States Patent
Raftis et al.

(10) Patent No.: US 10,316,977 B2
(45) Date of Patent: Jun. 11, 2019

(54) MULTI-OUTLET CHECK VALVE NOZZLE

(75) Inventors: Spiros G. Raftis, Pittsburgh, PA (US); Chris Raftis, legal representative, Carnegie, PA (US); Michael J. Duer, Zelienople, PA (US)

(73) Assignee: Red Valve Company, Inc., Carnegie, PA (US)

( * ) Notice: Subject to any disclaimer, the term of this patent is extended or adjusted under 35 U.S.C. 154(b) by 190 days.

(21) Appl. No.: 13/409,936

(22) Filed: Mar. 1, 2012

(65) Prior Publication Data

US 2012/0247595 A1 Oct. 4, 2012

Related U.S. Application Data

(60) Provisional application No. 61/447,911, filed on Mar. 1, 2011.

(51) Int. Cl.
*F16K 15/14* (2006.01)

(52) U.S. Cl.
CPC .......... *F16K 15/147* (2013.01); *F16K 15/144* (2013.01); *Y10T 137/87877* (2015.04)

(58) Field of Classification Search
CPC ...... F16K 15/147; F16K 15/14; F16K 15/144; F16K 15/16; F16K 15/185; F16K 7/02; F16K 21/02; F16K 21/04; B05B 15/0291; B05B 11/0062; B05B 11/007; B05B 1/046; B05B 1/042; B05B 1/044; B05B 1/18; B05B 1/185; A61M 2039/2433; A61M 2039/2493; Y10T 137/87877;
(Continued)

(56) References Cited

U.S. PATENT DOCUMENTS 795,310 A * 7/1905 Rogers .................... B05B 1/046
239/439
2,261,500 A * 11/1941 Lewis ....................... B05B 1/18
239/557
(Continued)

FOREIGN PATENT DOCUMENTS

FR 2752755 A1 * 3/1998 ............... B05B 1/10
WO WO 9627647 A1 * 9/1996 ............ B01J 8/1827

OTHER PUBLICATIONS

"Tideflex® Mixing System" catalog, Tideflex® Technologies, Division of Red Valve Company, Inc., 2006, 8 pp., www.tideflex.com.
(Continued)

*Primary Examiner* — Reinaldo Sanchez-Medina
*Assistant Examiner* — Hailey K. Do
(74) *Attorney, Agent, or Firm* — The Webb Law Firm

(57) ABSTRACT

A check valve nozzle having at least two discharge ports and providing improved mixing between the discharged fluid and the receiving fluid. The check valve nozzle may be of a "duckbill" type or a "pancake" type. The "duckbill" type may have discharge ports that vary in size, orientation with respect to the longitudinal centerline of the check valve nozzle, and/or construction materials. The "pancake" type may discharge the fluid from the check valve nozzle in a perpendicular, forward, or rearward direction. The check valve nozzle assembly contains a number of check valve nozzles that can vary in size, orientation with respect to the longitudinal centerline of the end cap of the assembly, and/or construction materials.

6 Claims, 13 Drawing Sheets

(58) Field of Classification Search
CPC ........... Y10T 137/784; Y10T 137/7885; Y10T 137/7882; F15K 17/164; F15K 15/202; Y10S 239/19
USPC ...... 251/147, 155; 137/512.1, 512.15, 512.3, 137/512.4, 516.25, 859, 512, 845–849; 239/451, 452, 519, 533.13, 546, 602; 4/516, 567, 903; 222/487, 482
See application file for complete search history.

(56) References Cited

U.S. PATENT DOCUMENTS

| | | | | |
|---|---|---|---|---|
| 2,392,085 A * | 1/1946 | Ferrel | ...................... | 239/533.13 |
| 2,402,741 A * | 6/1946 | Draviner | ................ | B05B 1/185 |
| | | | | 137/846 |
| 3,387,624 A * | 6/1968 | Soucy | ................ | B65D 47/2037 |
| | | | | 137/847 |
| 3,395,858 A * | 8/1968 | Spencer et al. | ................ | 417/566 |
| 3,565,106 A * | 2/1971 | Baumbach | ................ | E03C 1/298 |
| | | | | 137/513.3 |
| 4,642,097 A * | 2/1987 | Siposs | ...................... | 604/119 |
| 5,074,471 A * | 12/1991 | Baumgarten et al. | ..... | 239/284.1 |
| 5,730,336 A * | 3/1998 | Lerner | ...................... | A45F 3/16 |
| | | | | 137/849 |
| 5,924,452 A * | 7/1999 | Szpara | .................. | A61M 39/24 |
| | | | | 137/844 |
| 5,947,390 A * | 9/1999 | Smith | ...................... | B05B 1/04 |
| | | | | 239/418 |
| 6,138,710 A * | 10/2000 | Chomik | ................ | A61J 9/04 |
| | | | | 137/512.15 |
| 6,367,505 B1 | 4/2002 | Raftis et al. | | |
| 6,371,392 B1 * | 4/2002 | Steinman | ................ | B05B 1/323 |
| | | | | 239/533.13 |
| 6,739,527 B1 * | 5/2004 | Chung | .................. | B05B 1/185 |
| | | | | 239/107 |
| 7,040,554 B2 * | 5/2006 | Drennow | ................ | A23P 1/085 |
| | | | | 239/331 |
| 7,445,028 B1 * | 11/2008 | Aanonsen | ............. | F16K 15/147 |
| | | | | 137/512.4 |
| 8,621,677 B2 * | 1/2014 | Seibt | ...................... | B64D 11/02 |
| | | | | 137/848 |
| 8,668,168 B1 * | 3/2014 | Kelley et al. | .............. | 244/158.1 |
| 2003/0062426 A1 * | 4/2003 | Gregory | ................ | B05B 1/185 |
| | | | | 239/107 |
| 2006/0118189 A1 * | 6/2006 | Tekulve | ................ | A61M 39/22 |
| | | | | 137/846 |
| 2009/0147474 A1 * | 6/2009 | Chou | .................. | H05K 7/2019 |
| | | | | 361/695 |

OTHER PUBLICATIONS

"Series TFO Flow Restrictor", Red Valve Company, Inc., 1 p., Bulletin #528-91, www.redvalve.com.

* cited by examiner

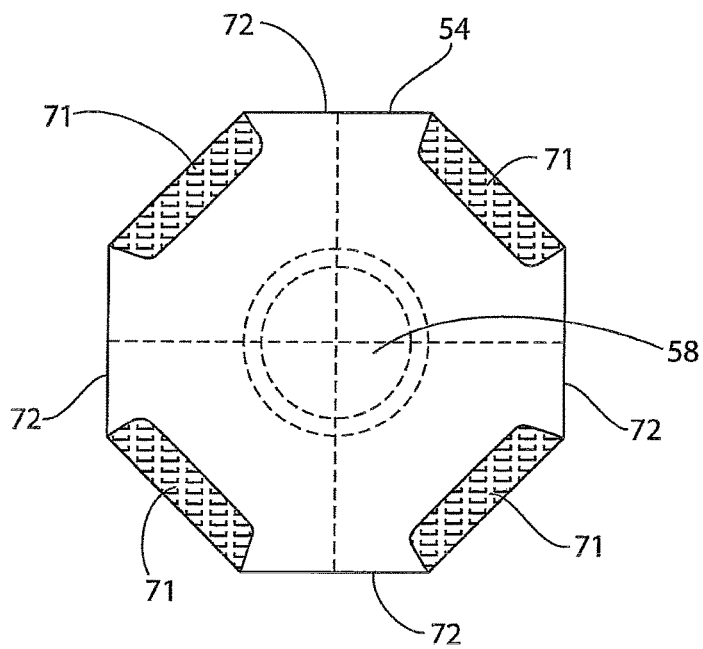
FIGURE 11
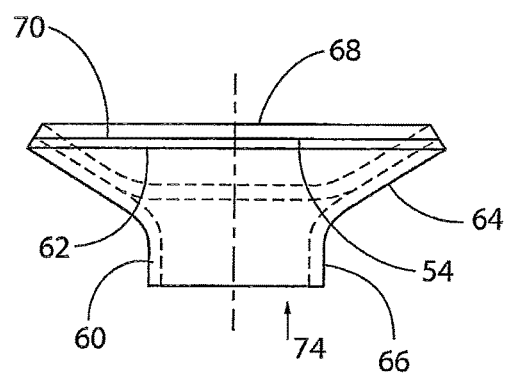 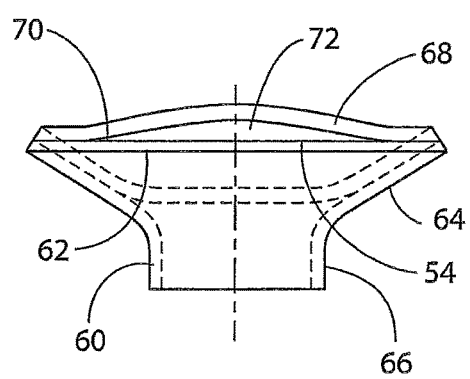
FIGURE 12A  FIGURE 12B

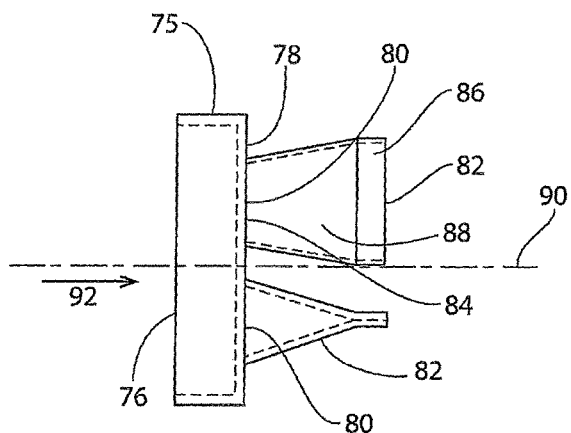
FIGURE 14A
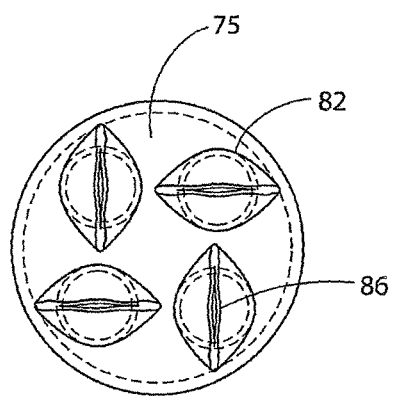 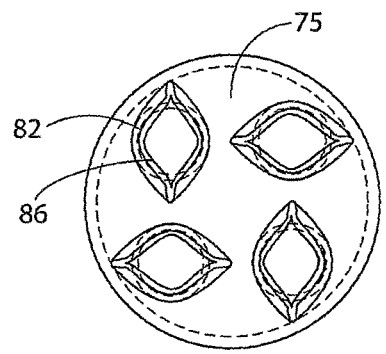
FIGURE 14B   FIGURE14C

MULTI-OUTLET CHECK VALVE NOZZLE

CROSS REFERENCE TO RELATED APPLICATIONS

This application claims priority to U.S. Provisional Patent Application No. 61/447,911 filed Mar. 1, 2011, the entire disclosure of which is hereby incorporated by reference.

BACKGROUND OF THE INVENTION

1. Field of the Invention

The present invention is directed to a check valve with improved mixing effectiveness of the primary flow through the valve with the receiving body of water or other fluid.

2. Description of Related Art

Traditional "duckbill" type check valve nozzles have a single inlet and a single discharge outlet opening and are primarily designed to prevent reverse flow. See, for example, U.S. Pat. No. 6,367,505 to Raftis et al. entitled "Check Valve with Oversized Bill." However, they are often used for other reasons such as providing a controlled pressure drop as a function of flow rate in the forward direction or, in diffuser systems, to reduce variation in the discharge jet velocity as a function of flow rate. Such traditional "duckbill" type check valve nozzles work well in these applications because they exhibit a linear relationship between headloss (pressure drop) across the check valve nozzle and flow rate when fluid is discharged through the check valve nozzle. In contrast, when fluid is discharged through a fixed orifice nozzle, the headloss (pressure drop) exhibits a "square law" relationship to the flow rate. This linear relationship between headloss and flow rate also makes traditional "duckbill" type check valve nozzles particularly useful for mixing systems because it provides a more consistent exit velocity as flow rate changes than a fixed orifice nozzle, i.e., exit velocity decreases less as flow rate decreases for a traditional "duckbill" check valve nozzle than for a fixed orifice nozzle. Therefore, the amount of mixing between the fluid discharged from the check valve nozzle and the receiving fluid remains more consistent.

In addition, the "duckbill" type check valve nozzle provides a flattened exit jet creating greater surface area than a conventional fixed circular orifice nozzle, which improves mixing.

While traditional "duckbill" check valve nozzles have found use as mixing nozzles, their mixing ability is limited. It is therefore an object of the present invention to provide a check valve nozzle with improved mixing capabilities.

SUMMARY OF THE INVENTION

One embodiment of the present invention is a "duckbill" type check valve nozzle with an upstream portion mountable on the discharge end of a conduit, a downstream discharge portion, a transition portion between the upstream inlet portion and the downstream outlet portion, and at least two discharge ports located in the transition portion, the downstream outlet portion, or both. The primary flow of fluid through the check valve nozzle is parallel to the longitudinal centerline of the check valve nozzle and there is a linear relationship between headloss across the check valve nozzle and the flow rate of the fluid through the check valve nozzle. The check valve nozzle may be made at least in part of elastomeric material or reinforced elastomeric material.

The discharge ports may be of the same or different sizes. They may be oriented at the same or different angles from the longitudinal centerline of the check valve nozzle such that they discharge fluid in directions other than the direction of primary flow. They may also be made of different materials. Thus, each discharge opening may have a unique combination of materials, size, and angle with respect to the longitudinal centerline of the check valve nozzle. In addition, the check valve nozzle may have some discharge ports that are fixed in size and shape such that they do not change size and shape as fluid passes through them. The check valve nozzle may also have at least two inlet ports in the upstream inlet portion.

In another embodiment, the present invention is a "pancake" type check valve nozzle comprising a back plate comprising a disc containing a central bore and having a top face and a bottom face; a cuff comprising a flange and an inlet conduit where the flange is attached to the bottom face of the back plate around the entire periphery of the flange to form a leak proof seal; a front plate attached to the top face of the back plate in at least two places around the periphery of the back plate; and at least two discharge ports formed where the front plate is not attached to the back plate, wherein the fluid flowing through the inlet portion of the cuff will discharge through the discharge ports. At least one of the front plate or the back plate is flexible and may be made of an elastomeric material or a reinforced elastomeric material. The back plate, front plate, and cuff may be concave or convex to direct flow in a forward or rearward direction, respectively.

In addition, the present invention is directed to a check valve nozzle assembly that is comprised of an end cap with an upstream inlet portion mountable to a discharge end of a conduit and a downstream outlet portion containing at least two discharge outlets. Attached to each discharge outlet is a "duckbill" type check valve nozzle having an inlet, an outlet portion, and a transition portion between the inlet and the outlet portion. These check valve nozzles may be oriented at different angles relative to one another so as to direct the primary flow in different directions as it exits the check valve nozzle assembly. They may be made at least in part from elastomeric material or reinforced elastomeric material. They may also be of the type described above. Alternatively, one or more of the discharge outlets in the end cap may be left as a fixed opening without any check valve nozzle attached thereto. The end cap may be rigid or flexible and may be made of an elastomeric material, a flexible elastomeric material, a reinforced elastomeric material, metal, or plastic.

BRIEF DESCRIPTION OF THE DRAWINGS

FIG. 11 is a top view of the back plate of an octagonal "pancake" type check valve nozzle having four discharge ports showing the areas where the front plate is attached to the top face of the back plate.

FIG. 12A is a side view of a fully closed circular "pancake" type check valve nozzle having a convex shape to direct the fluid in a forward direction.

FIG. 12B is a side view of a fully open circular "pancake" type check valve nozzle having a convex shape to direct the fluid in a forward direction.

FIG. 14A is a side view of a check valve nozzle assembly having four discharge outlets and four check valve nozzles oriented at different angles to the longitudinal end cap centerline.

FIG. 14B is an end view of a partially open check valve nozzle assembly having four discharge outlets and four check valve nozzles oriented at different angles to the longitudinal end cap centerline.

FIG. 14C is an end view of a fully open check valve nozzle assembly having four discharge outlets and four check valve nozzles oriented at different angles to the longitudinal end cap centerline.

DETAILED DESCRIPTION OF THE PREFERRED EMBODIMENTS

The present invention seeks to provide a check valve nozzle that provides efficient mixing of the fluid being discharged from the check valve nozzle and the receiving fluid.

Figure 1A:
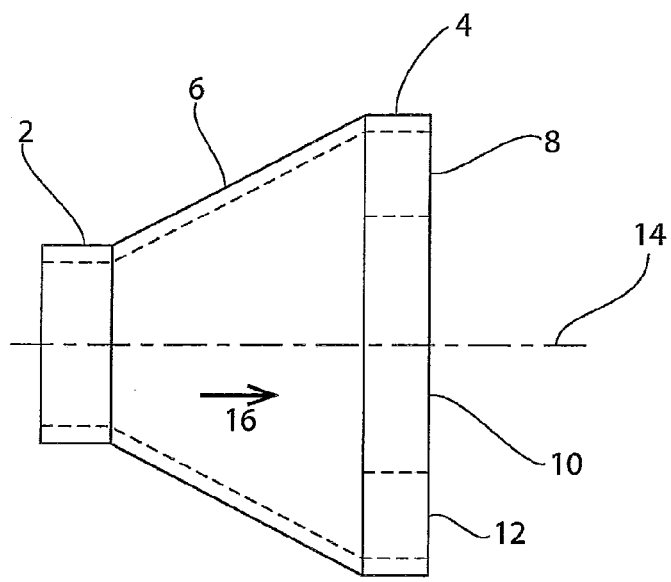
FIG. 1A is a side view of a "duckbill" type check valve nozzle having three discharge ports.
Figure 1B:
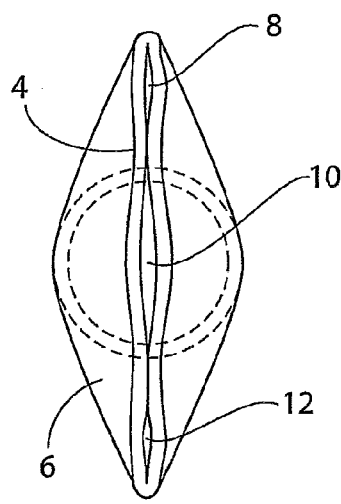
FIG. 1B is an end view of a partially open "duckbill" type check valve nozzle having three discharge ports.
Figure 1C:
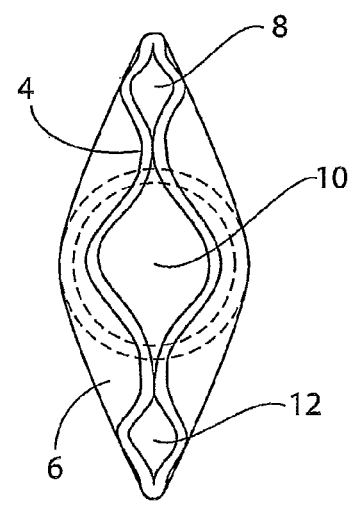
FIG. 1C is an end view of a fully open "duckbill" type check valve nozzle having three discharge ports.

In one embodiment of the present invention, FIGS. 1A-1C, the check valve nozzle has an upstream inlet portion 2 that is mountable on a discharge conduit, a downstream outlet portion 4, and a transition portion 6 that extends between the inlet portion 2 and the outlet portion 4. The outlet portion 4 contains three discharge ports 8, 10, 12 that provide for three separate streams of discharge fluid from the check valve nozzle. The discharge ports change size and shape as fluid is discharged through them and are adapted to prevent backflow of the receiving fluid from entering the check valve nozzle. All of the discharge ports 8, 10, 12 are oriented at a 0 degree angle to the longitudinal centerline 14 of the check valve nozzle. Having three streams increases the surface area of the discharged fluid and enhances mixing efficiency with the receiving fluid.

The primary flow 16 through the check valve nozzle is parallel to the longitudinal centerline 14 of the check valve nozzle. The headloss (pressure drop) as the fluid flows through the check valve nozzle has a linear relationship with the flow rate of the fluid passing through the check valve nozzle. This provides improved mixing over a fixed orifice nozzle where there is a "square law" relationship between headloss and flow rate.

Figure 2A:
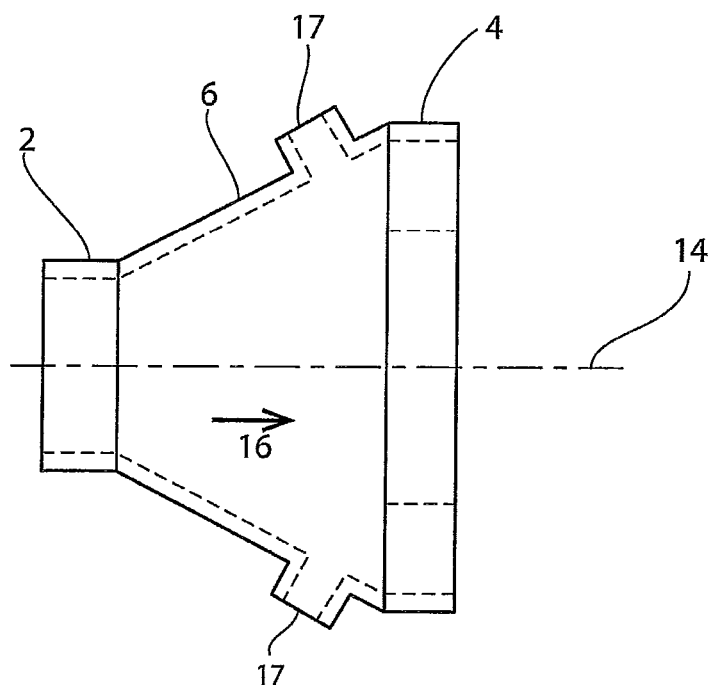
FIG. 2A is a side view of a "duckbill" type check valve nozzle having discharge ports in the transition portion.
Figure 2B:
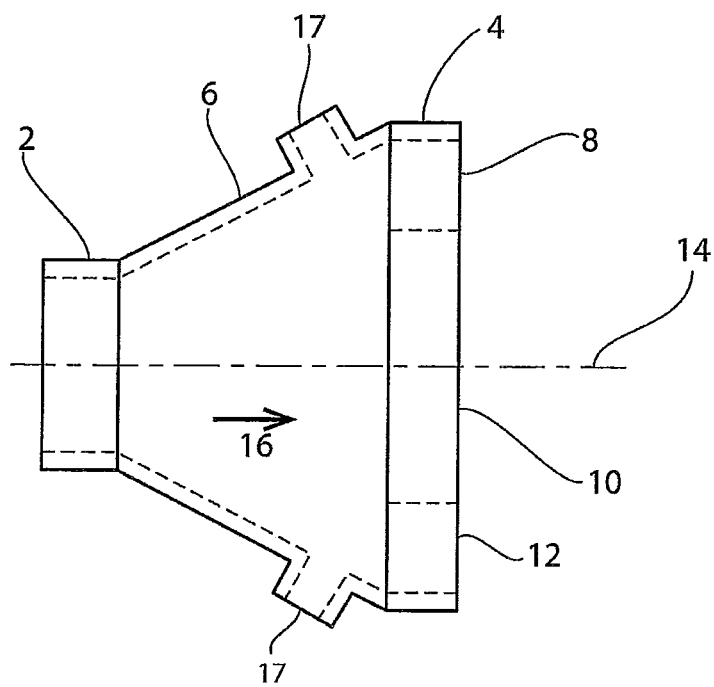
FIG. 2B is a side view of a "duckbill" type check valve nozzle having discharge ports in the transition portion and the outlet portion.

While three discharge ports have been described here and are shown in FIGS. 1A-1C, any number of discharge ports may be employed as long as there are at least two. Further, while only discharge ports in the outlet portion 4 of the check valve nozzle are described in this embodiment and are shown in FIGS. 1A-1C, the discharge ports may be in the outlet portion 4, the transition portion 6, or both. See FIGS. 2A and 2B. Thus, there can be at least two discharge ports 8, 10, 12 in the outlet portion 4 or at least two discharge ports 17 in the transition portion 6 or at least two discharge ports arranged such that at least one of the discharge ports is in the outlet portion 4 and at least one of the discharge ports is in the transition portion 6.

In FIGS. 1A-1C, two of the discharge ports are shown as being the same size and as being smaller than the third discharge port. However, the discharge ports may be any combination of sizes. They can all be the same size, they can all be different sizes, or any combination thereof.

The discharge ports may be made of an elastomeric material or a reinforced elastomeric material. Suitable elastomeric materials include Neoprene®, natural or synthetic "Gum Rubber," Viton®, and similar materials. Suitable reinforcement includes nylon, polyester, Kevlar®, or similar material. The discharge ports may be made of the same or different materials from one another. By changing the elastomer, the wall thickness, or the size, location, and arrangement of reinforcing plies, each exit port can be made to a different stiffness to provide different flow characteristics to each.

Figure 3:
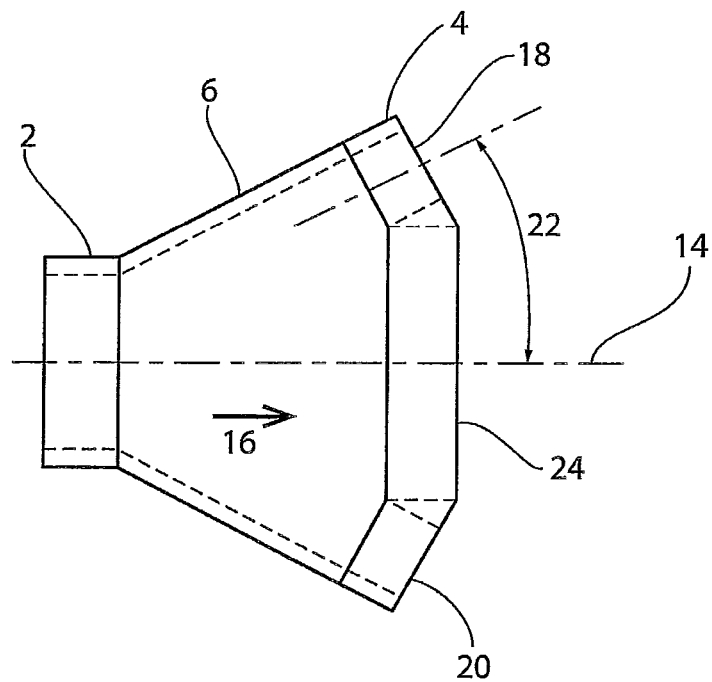
FIG. 3 is a side view of a "duckbill" type check valve nozzle having two discharge ports at an outward angle to the longitudinal centerline of the check valve nozzle and one discharge port at a 0 degree angle to the longitudinal centerline of the check valve nozzle.

FIG. 3 shows an alternative configuration of the first embodiment. Two of the three discharge ports 18, 20 are shown placed at an outward angle 22 from the longitudinal centerline 14 of the check valve nozzle. This directs the flow from these two ports in a direction away from the primary flow 16 while the flow through discharge port 24, which is at a 0 degree angle to the longitudinal centerline 14, remains directed in the direction of the primary flow 16. This configuration has advantages in situations where the receiving fluid is contained in a relatively small enclosure, such as a potable water tank, where the discharge from the angled discharge ports 18, 20 can be redirected off the sidewalls of the containment vessel to increase turbulence and improve mixing.

While FIG. 3 shows two ports 18, 20 oriented at the same outward angle 22 and one port 24 remaining oriented in the direction of primary flow 16, any of the discharge ports may be oriented at any outward angle from the longitudinal centerline 14. Thus, some discharge ports can be at the same angle or all of the discharge ports can be at different angles. The discharge ports may be oriented at an outward angle greater than 0 degrees and less than 180 degrees.

Figure 4:
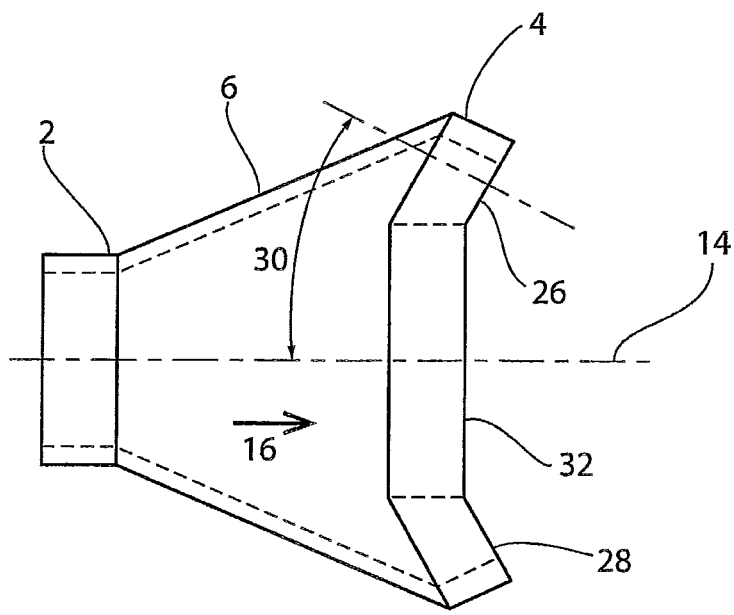
FIG. 4 is a side view of a "duckbill" type check valve nozzle having two discharge ports at an inward angle to the longitudinal centerline of the check valve nozzle and one discharge port at a 0 degree angle to the longitudinal centerline of the check valve nozzle.

FIG. 4 shows a check valve nozzle similar to the one shown in FIG. 3 except that two of the three discharge ports 26, 28 are shown placed at an inward angle 30 from the longitudinal centerline 14 of the check valve nozzle. This directs the flow from these two ports in a direction into the primary flow while the flow through discharge port 32, which is at a 0 degree angle to the longitudinal centerline 14, remains directed in the direction of the primary flow 16. This configuration has advantages where the receiving body of fluid is contained in a long but relatively small diameter enclosure such as a pipe. The flow from discharge ports 26, 28 impinges on the flow from discharge port 32 creating increased turbulence and improved mixing.

While FIG. 4 shows two ports 26, 28 oriented at the same inward angle 30 and one port 32 remaining oriented in the direction of primary flow 16, any of the discharge ports may be oriented at any inward angle from the longitudinal centerline 14. Thus, some discharge ports can be at the same angle, or all of the discharge ports can be at different angles. The discharge ports may be oriented at an inward angle greater than 0 degrees and less than 90 degrees.

Further, any discharge port may be placed at either an outward angle, an inward angle, or a 0 degree angle to the longitudinal centerline 14. Thus, all discharge ports may be oriented in an outward direction, all of the discharge ports may be oriented in an inward direction, all discharge ports may be oriented at a 0 degree angle to the longitudinal centerline 14, or any combination thereof. As with the first configuration of this embodiment where all of the discharge ports were at a 0 degree angle to the centerline 14 of the check valve nozzle, the ports may vary in size and materials.

Figure 5A:
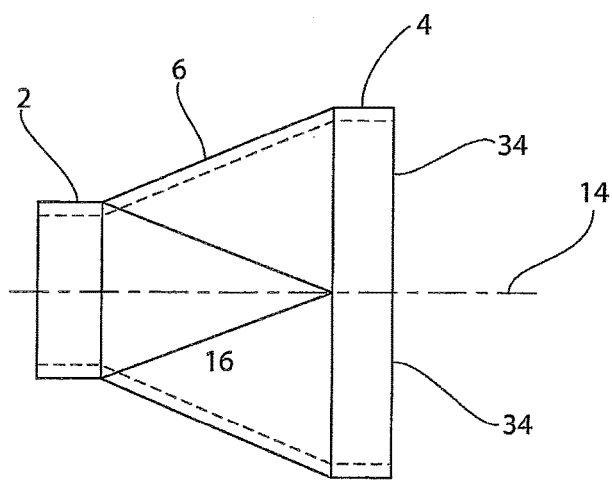
FIG. 5A is a top view of a three lipped "duckbill" type check valve nozzle having four discharge ports.
Figure 5B:
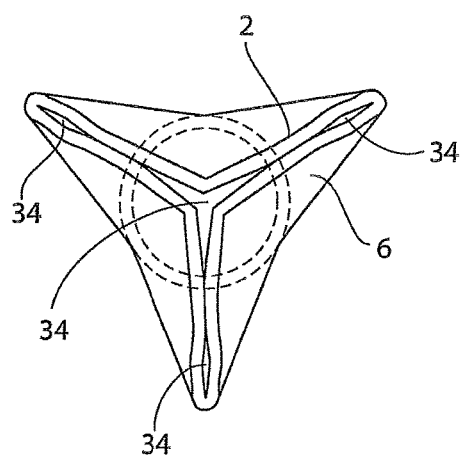
FIG. 5B is an end view of a partially open three lipped "duckbill" type check valve nozzle having four discharge ports.
Figure 5C:
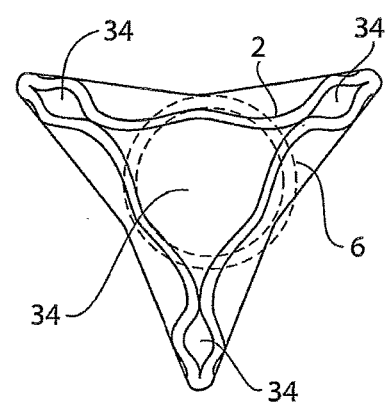
FIG. 5C is an end view of a fully open three lipped "duckbill" type check valve nozzle having four discharge ports.
Figure 6:
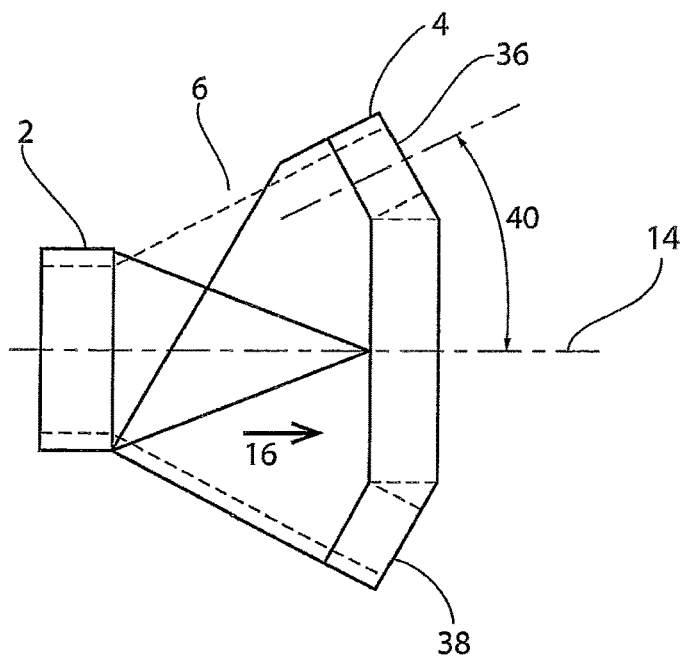
FIG. 6 is a top view of a three lipped "duckbill" type check valve nozzle having three discharge ports at an outward angle to the longitudinal centerline of the check valve nozzle and one discharge port at a 0 degree angle to the longitudinal centerline of the check valve nozzle.
Figure 7:
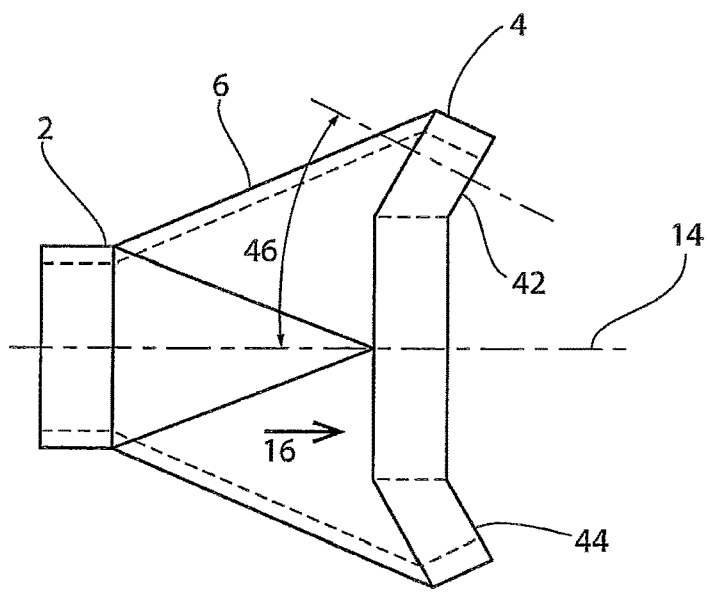
FIG. 7 is a top view of a three lipped "duckbill" type check valve nozzle having three discharge ports at an inward angle to the longitudinal centerline of the check valve nozzle and one discharge port at a 0 degree angle to the longitudinal centerline of the check valve nozzle.

While FIGS. 1-4 show a one lipped "duckbill" check valve nozzle, all of the previously described characteristics of the present invention also apply to "duckbill" valves having more than one lip. For example, FIGS. 5A-5C show a three lipped "duckbill" check valve nozzle with all ports 34 at a 0 degree angle to the longitudinal centerline 14. FIG. 6 shows a three lipped "duckbill" check valve nozzle with three of the four ports (two are shown in FIGS. 6-36, 38) at an outward angle 40 to the longitudinal centerline 14. FIG. 7 shows a three lipped "duckbill" check valve nozzle with three of the four ports (two are shown in FIGS. 7-42, 44) at an outward angle 46 to the longitudinal centerline 14.

Figure 8A:
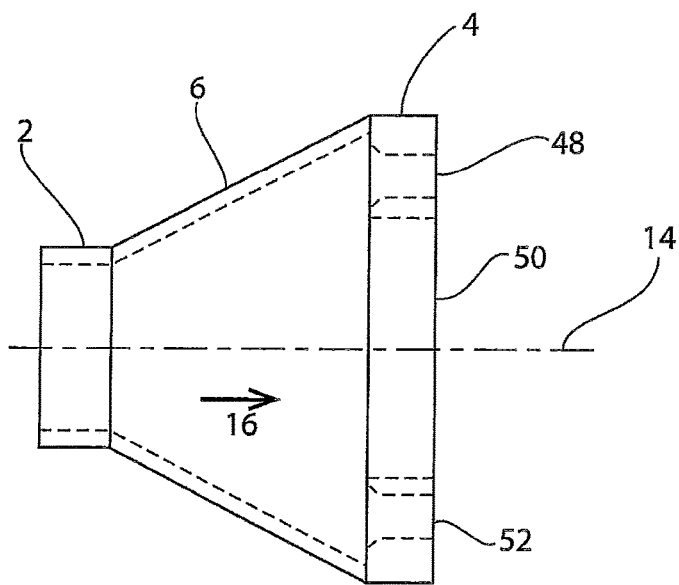
FIG. 8A is a side view of a "duckbill" type check valve nozzle having two fixed discharge ports and one discharge port that changes size and shape as fluid flows through it.
Figure 8B:
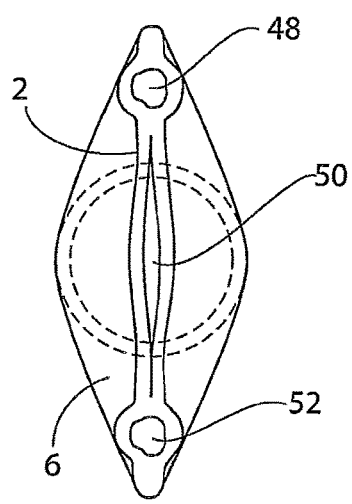
FIG. 8B is an end view of a partially open "duckbill" type check valve nozzle having two fixed discharge ports and one discharge port that changes size and shape as fluid flows through it.
Figure 8C:
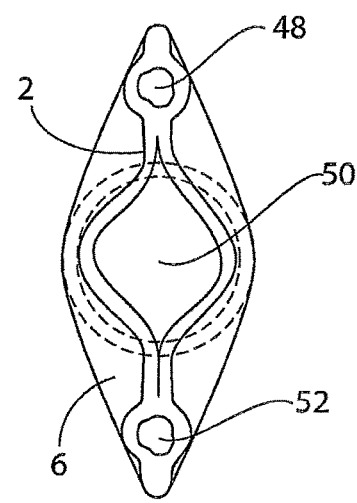
FIG. 8C is an end view of a fully open "duckbill" type check valve nozzle having two fixed discharge ports and one discharge port that changes size and shape as fluid flows through it.

In addition, some portion of the discharge ports in any of the described embodiments may be of fixed size and shape such that the flow of fluid through them does not change their size and shape. This configuration may be used where fear of backflow of the receiving fluid into the check valve nozzle is not an issue. FIGS. 8A-8C show an example of such a configuration based on the check valve nozzle shown in FIG. 1. Discharge ports 48, 52 are fixed in size and shape while discharge port 50 changes in size and shape as fluid passes through it. FIGS. 8A-8C show merely one embodiment using discharge ports of fixed size and shape. Such fixed discharge ports may be substituted for any discharge ports shown or described above.

Figure 9:
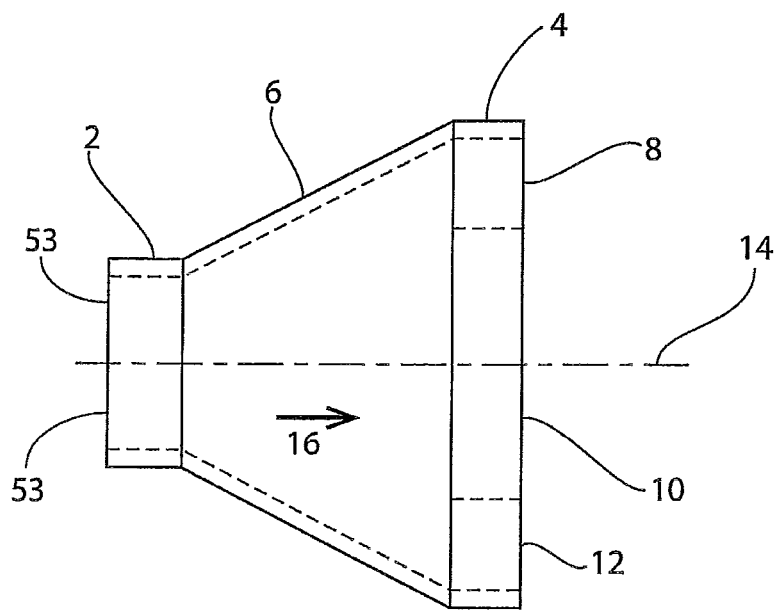
FIG. 9 is a side view of a "duckbill" type check valve nozzle having three discharge ports and two inlet ports.

As shown in FIG. 9, the check valve nozzle may also contain more than one inlet port 53 in the upstream inlet portion to allow more than one fluid stream to be mixed in the valve prior to discharge into and mixing with the receiving fluid.

Figure 10A:
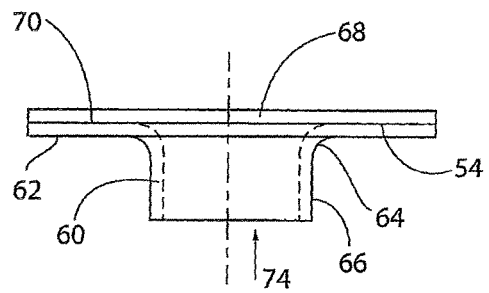
FIG. 10A is a side view of a fully closed circular "pancake" type check valve nozzle having two discharge ports.
Figure 10B:
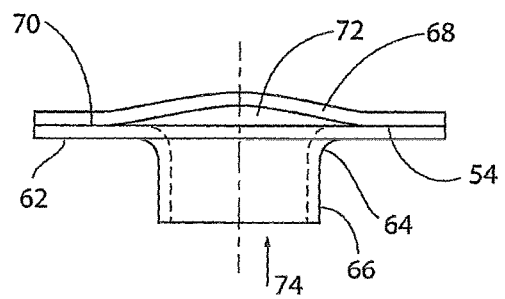
FIG. 10B is a side view of a fully open circular "pancake" type check valve nozzle having two discharge ports.
Figure 10C:
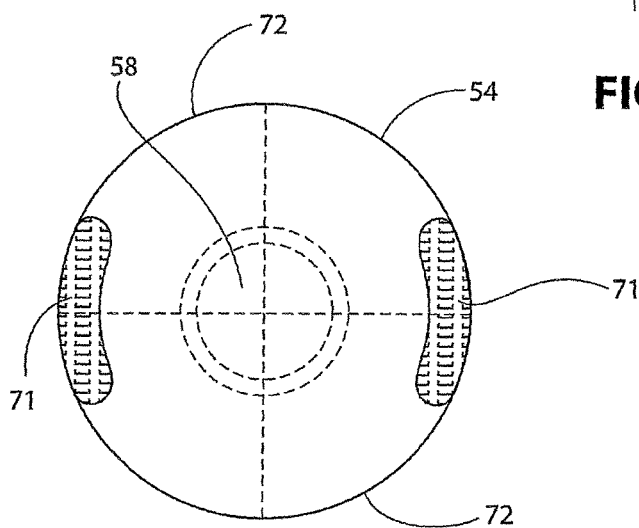
FIG. 10C is a top view of the back plate of a circular "pancake" type check valve nozzle having two discharge ports showing the areas where the front plate is attached to the top face of the back plate.

A second embodiment of the present invention is a "pancake" type check valve nozzle shown in FIGS. 10A-10C. The check valve nozzle has a back plate 54 which is a disc containing a central bore 58. A circular cuff 60 is attached to the bottom face 62 of the back plate 54. The cuff 60 has a flange 64 and an inlet conduit 66. The flange 64 is attached to one end of the inlet conduit 66 and extends away from the sidewalls of the inlet conduit 66. The other end of the inlet conduit 66 is mountable on a discharge conduit. The flange 64 of the cuff 60 is attached around its entire periphery to the bottom face 62 of the back plate 54 to form a leak proof seal. The flange 64 of the cuff 60 may also be molded or fabricated as an integral part of the back plate 54. A circular front plate 68 is preferably the same size as the back plate 54 and is attached to the top face 70 of the back plate 54 in at least two locations 71 near the periphery of the back plate 54, leaving at least two areas where the front plate 68 is not attached to the back plate 54. Discharge outlets 72 are formed where the front plate 68 is not attached to the back plate 54. FIG. 10C shows a top view of a check valve nozzle with two attachment points 71 creating two discharge openings 72. At least one of the front plate 68 or the back plate 54 is constructed of flexible material, for example, low durometer elastomer (e.g., 35 on the Shore A scale) with or without reinforcement such as fabric or mesh. The fluid flows through the inlet conduit 66 of the cuff 60, through the central bore 58 of the back plate 54 and the fluid pressure causes the front plate 68 and/or back plate 54 to flex, allowing the fluid to be discharged from the two discharge ports 72 created where the front plate 68 is not attached to the back plate 54. The flow is redirected at a 90 degree angle from the direction of the primary flow 74 through the inlet conduit 66 of the cuff 60.

The cuff may be constructed of rigid material such as high durometer elastomer (e.g., 90 on the Shore A scale), plastic, metal, or other suitable rigid material or a flexible material such as low durometer elastomer (e.g., 35 on the Shore A scale) with or without reinforcement such as fabric or mesh.

Any number of discharge ports may be utilized as long as there are at least two. This is accomplished by increasing the number of attachment points between the back plate 54 and the front plate 68. For example, FIG. 11 shows an octagonal "pancake" type check valve nozzle with four attachment points 71 resulting in four discharge ports 72.

The back plate, cuff, and front plate need not be circular and may be of any geometry including oval, elliptical, trapezoidal, rectangular, polygonal, or any other suitable shape. It is preferred that the back plate, cuff, and front plate are all of the same geometry. As an example, a "pancake" type check valve nozzle with an octagonal geometry and four discharge ports 72 is shown in FIG. 11.

The "pancake" type check valve nozzle can also be constructed to direct flow in a generally forward direction more in line with the primary flow 74. As shown in FIGS. 12A and 12B, to cause the flow from the discharge ports 72 to be in the generally forward direction, the back plate 54, cuff 60, and front plate 68 are convex with respect to the primary flow 74.

Figure 13A:
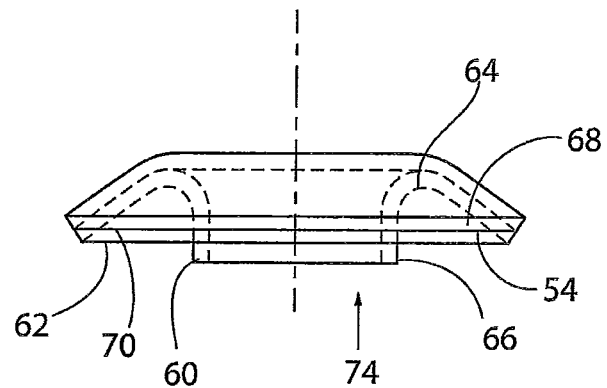
FIG. 13A is a side view of a fully closed circular "pancake" type check valve nozzle having two discharge ports and a concave shape to direct the fluid in a rearward direction.
Figure 13B:
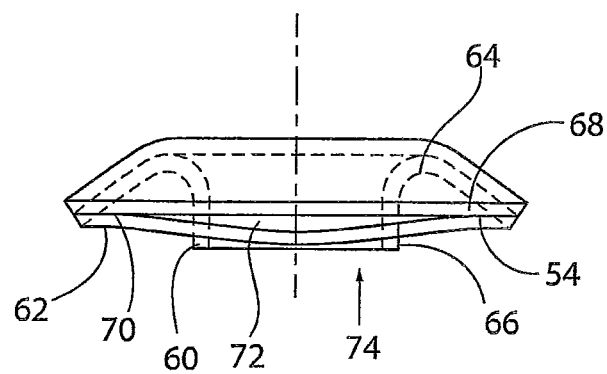
FIG. 13B is a side view of a fully open circular "pancake" type check valve nozzle having two discharge ports and a concave shape to direct the fluid in a rearward direction.

The "pancake" type check valve nozzle can also be constructed to direct flow in a generally rearward direction, more in the direction opposite to the direction of the primary flow 74. As shown in FIGS. 13A and 13B, to cause the flow from the discharge ports 72 to be in the generally rearward direction, the back plate 54, cuff 60, and front plate 68 are concave with respect to the primary flow 74.

A third embodiment of the present invention is a check valve nozzle assembly shown in FIGS. 14A-14C. The check valve nozzle assembly has an end cap 75 mountable on the discharge end of a conduit. The end cap 75 has an upstream inlet portion 76 that is mountable on a discharge conduit and a downstream outlet portion 78. The outlet portion 78 contains at least two discharge outlets 80. Check valve nozzles 82 comprising an upstream inlet 84, a downstream outlet portion 86, and a transition portion 88 between the upstream inlet 84 and the downstream outlet portion 86 are attached to the end cap 75. The inlet 84 of the check valve nozzle 82 is attached to the discharge outlet 80 in the outlet portion 78 of the end cap 75. Each discharge outlet 80 is provided with a check valve nozzle 82. The check valve nozzles 82 can be either separately attached to the end cap 75 by suitable means such as adhesive bonding or clamping or molded or fabricated as an integral part of the end cap 75. The check valve nozzles are adapted to prevent backflow of the receiving fluid from entering the check valve nozzle assembly. The check valve nozzles 82 are oriented at different angles to the end cap centerline 90. This directs the flow from each check valve nozzle in a different direction, increasing the mixing efficiency of the check valve nozzle assembly.

The primary flow 92 through the check valve nozzle assembly is parallel to the longitudinal centerline 90 of the end cap 75. The headloss (pressure drop) as the fluid flows through the multiple check valve nozzles 82 has a linear relationship with the flow rate of the fluid passing through the check valve nozzles 82. This provides improved mixing over a fixed orifice nozzle where there is a "square law" relationship between headloss and flow rate.

While four check valve nozzles are shown in FIGS. 14B-14C, any number of check valve nozzles may be employed as long as there are at least two. In FIGS. 14A-14C, all of the check valve nozzles are shown as being the same size. However, the check valve nozzles may be any combination of sizes. They can all be the same size, they can all be different sizes, or any combination thereof.

The check valve nozzles may be made of an elastomeric material or a reinforced elastomeric material. Suitable elastomeric materials include Neoprene®, natural or synthetic "Gum Rubber," Viton®, and similar materials. Suitable reinforcement includes nylon, polyester, Kevlar®, or similar material. The check valve nozzles may be made of the same or different materials from one another. By changing the elastomer, the wall thickness, or the size, location, and arrangement of reinforcing plies, each exit port can be made to a different stiffness to provide different flow characteristics to each.

The check valve nozzles 82 may be of any of the "duckbill" type check valve nozzles previously described as one embodiment of the present invention.

The check valve nozzles 82, while shown in FIGS. 14A-14C oriented at different angles to the longitudinal centerline 90 of the end cap 75, may be oriented at any angle with respect to the longitudinal centerline 90 of the end cap 75 and each other. They may all be at the same angle, all at different angles, or any combination thereof.

Also, in an application where backflow of the receiving fluid into the check valve nozzle assembly is not a concern, one or more of the discharge outlets may be left open by not attaching a check valve nozzle.

Figure 15A:
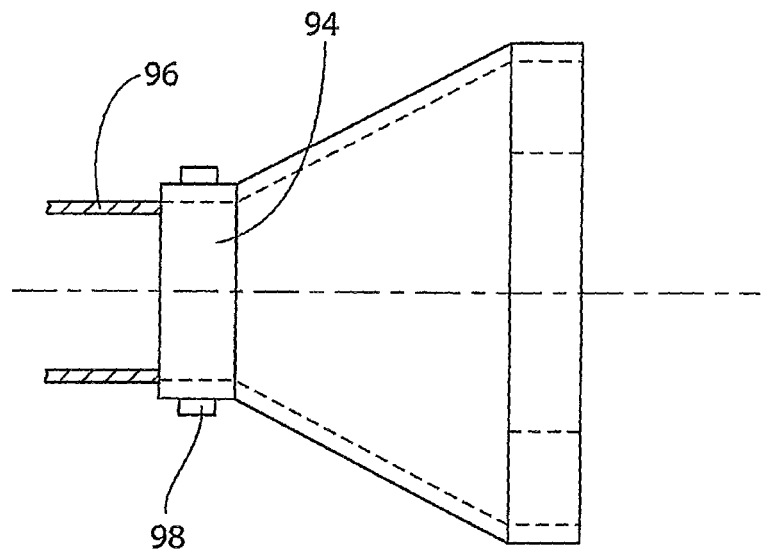
FIG. 15A is a side view of one embodiment of the inventive check valve nozzle clamped to the discharge end of a conduit.
Figure 15B:
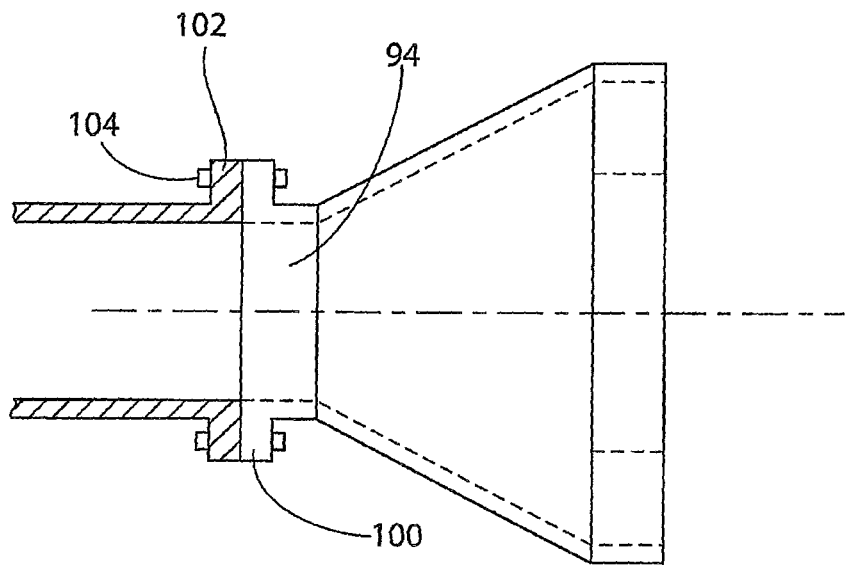
FIG. 15B is a side view of one embodiment of the inventive check valve nozzle attached to the discharge end of a conduit using mating flanges.

Any of the embodiments described herein may be mounted to a discharge end of a conduit having any shape including but not limited to circular and elliptical. This mounting may be accomplished by any suitable means. For example, the check valve nozzle inlet portion 94 may be slipped over the discharge end of the conduit 96 and secured with a clamp 98 as shown in FIG. 15A. Alternatively, the check valve nozzle may be provided with a flange 100 on the inlet portion 94 that is secured to a mating flange 102 on the discharge end of the conduit 96 with suitable fasteners 104 as shown in FIG. 15B. Suitable flanges include but are not limited to ANSI 125# flanges and 4-hole flanges.

Figure 15C:
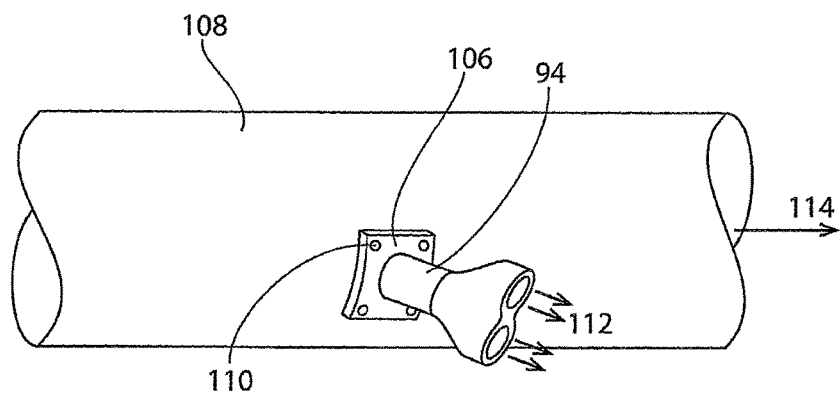
FIG. 15C is a perspective view of one embodiment of the inventive check valve nozzle attached to the outer circumference of a conduit.
Figure 15D:
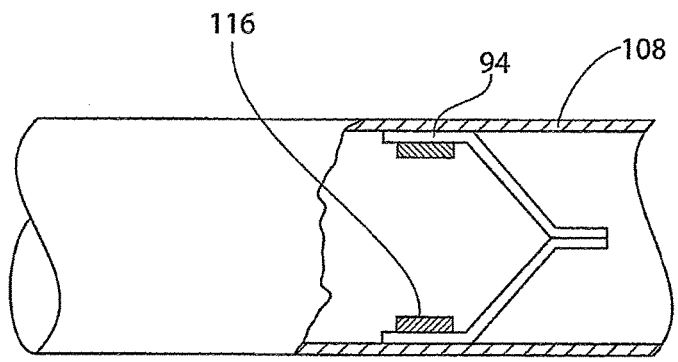
FIG. 15D is a cross-sectional view of one embodiment of the inventive check valve nozzle attached to the interior of the conduit around the circumference.

Alternatively, as shown in FIG. 15C, the check valve nozzle may be provided with a flange 106 on the inlet portion 94 that is secured to the circumference of a conduit 108 using suitable fasteners 110 such that it directs flow 112 at an outward angle to the primary flow 114 through the conduit 108. In another embodiment, shown in FIG. 15D, the inlet portion 94 of the check valve nozzle may be secured around the interior circumference of a conduit 108 using an internal clamp 116.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A check valve nozzle comprising:
an upstream inlet portion located at a first end of the check valve nozzle;
a downstream outlet portion located at a second end of the check valve nozzle, the downstream outlet portion at the second end positioned opposite and facing the upstream inlet portion at the first end;
a transition portion that extends from the upstream inlet portion of the check valve nozzle to the downstream outlet portion of the check valve nozzle at an outward angle such that an inner diameter of the transition portion increases from the upstream inlet portion to the downstream outlet portion;
at least two secondary discharge ports located in the downstream outlet portion; and at least one primary discharge port located in the downstream outlet portion and positioned between the at least two secondary discharge ports, wherein opposite sides of the downstream outlet portion are off-set at an outward angle with respect to a center section of the downstream outlet portion such that the center section is aligned with a longitudinal centerline of the check valve nozzle and an inner diameter of the downstream outlet portion is greater than the inner diameter of the transition portion, wherein the at least one primary discharge port is positioned in the center section of the downstream outlet portion so that the at least one primary discharge port is aligned with the longitudinal centerline of the check valve nozzle such that fluid flows from the inlet upstream portion and at least through the at least one primary discharge port in a direction of a primary flow of fluid that is parallel to the longitudinal centerline, and wherein at least one first secondary discharge port of the at least two secondary discharge ports is positioned in one outward angled side of the downstream outlet portion and at least one second secondary discharge port of the at least two secondary discharge ports is positioned in an opposite second outward angled side of the downstream outlet portion such that an entire portion of the at least one first secondary discharge port and the at least one second secondary discharge port are directed at outward angles and in different directions from the longitudinal centerline of the check valve nozzle to direct flow away from the primary flow of fluid as the fluid flows through at least the transition portion and toward the downstream outlet portion of the check valve nozzle, wherein the check valve is adapted to prevent backflow of fluid through the check valve nozzle, and wherein at least one of the discharge ports is made from materials having at least one of a different thickness, a different durometer, and a different reinforcing structure from at least one of the other discharge ports.

2. The check valve nozzle according to claim 1 wherein the at least one primary discharge port or one of the at least two secondary discharge ports is a different size than at least one of the other discharge ports.

3. The check valve nozzle according to claim 1 wherein the outward angle is greater than 0 degrees and less than 180 degrees.

4. The check valve nozzle according to claim 1 wherein at least one of the discharge ports is made at least in part from an elastomeric material or a reinforced elastomeric material.

5. The check valve nozzle according to claim 1 wherein at least one of the discharge ports is made from different materials than at least one other discharge port.

6. The check valve nozzle according to claim 1 wherein the inlet portion is adapted to be secured to an outlet end of a conduit, an interior surface of a conduit, or the outer circumference of a conduit.

* * * * *